April 8, 1958     W. F. PETTIT, JR., ET AL     2,829,464
FISHING FLOAT
Filed Feb. 3, 1955
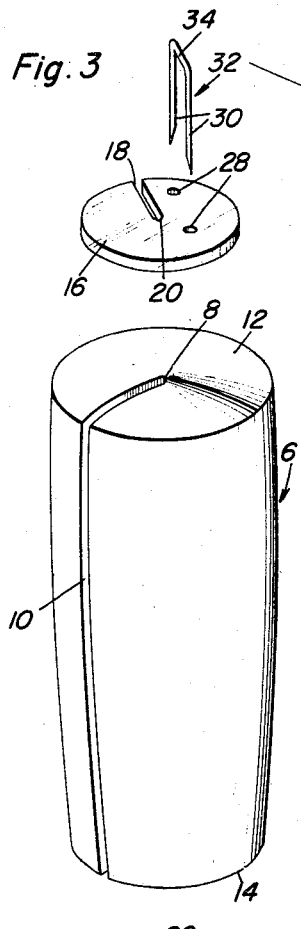
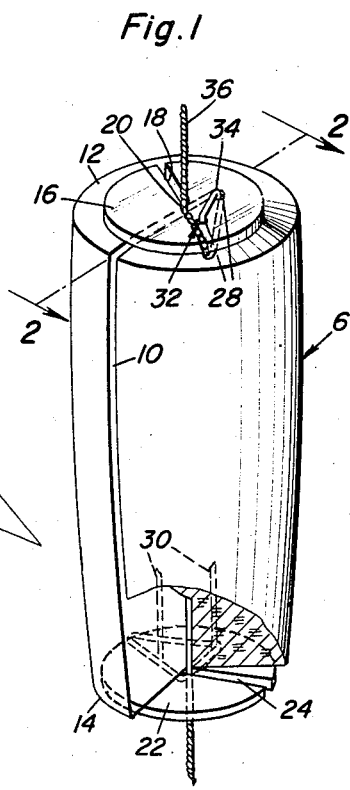
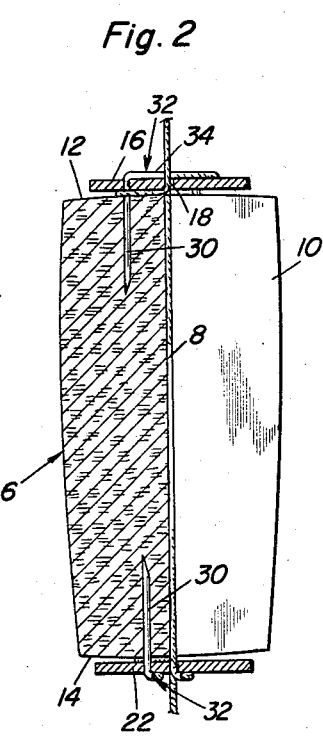
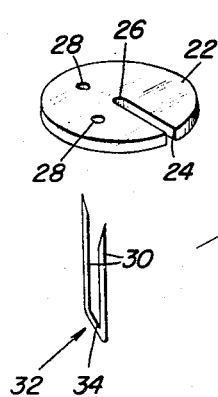
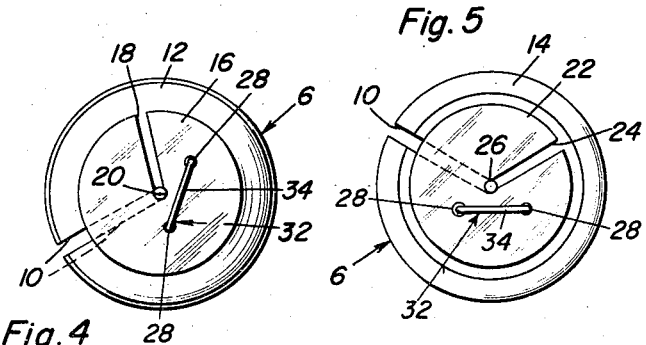
William F. Pettit, Jr.
Herschel H. Helm
INVENTORS,
BY Clarence A. O'Brien
and Harvey B. Jacobson
Attorneys

2,829,464

FISHING FLOAT

William F. Pettit, Jr., and Herschel H. Helm,
New Orleans, La.

Application February 3, 1955, Serial No. 485,928

2 Claims. (Cl. 43—44.91)

The present invention relates to a fishing line attachment which, while it may take the form of a sinker, is preferably in the form of a float, the object of the invention being to provide a simple and economical float which may be readily attached to or detached from a fishing line.

Many and varied styles of quick-attachable floats are in use. For the most part, the float has an axial bore which opens through the respective ends and there is a lengthwise kerf or slot provided which is radially disposed and opens not only through the ends but through the lengthwise side and communicates with the line bore. Fasteners of one type or another are usually secured to the respective ends and cooperate with the slot and bore and also with the line so that one may fit the line into the slot and connect it with the end fasteners so that it is temporarily but securely attached to the line.

An object of the invention is to permanently secure improved line fasteners to the respective ends of the float to avoid the need for so-called movable parts which often get out of order and require special instructions to anglers when marketed for use.

In carrying out this invention, disks or washers are secured to the respective ends of the float. These have radial slots therein and the slots are out of line with a slot in the float so that it is possible to seat the line in the slot in the float and to anchor the line in the slots in the respective disks to thus temporarily attach the float to the line.

In the drawings wherein like numerals are employed to designate like parts throughout the views:

Figure 1 is a perspective view, partially in section, of the improved float;

Figure 2 is a section taken vertically along the general line 2—2 of Figure 1, with portions appearing in elevation;

Figure 3 is an exploded perspective view showing the structural details employed in the float;

Figure 4 is a top plan view of the construction shown in Figure 1; and

Figure 5 is a bottom plan view of the same.

By way of introduction to the detailed description, it is to be pointed out that the expression "elongate body" is here used to designate a float or a sinker of any size or material. For convenience, the disclosure is primarily directed to a float and while the float is preferably of cork, it is obvious that it may be of commercial plastics or any suitable buoyant material and thus molded or otherwise manufactured. The float or body is denoted in the drawing by the numeral 6. The lengthwise axial bore is denoted at 8, and the side slot or kerf is denoted at 10. This radiates from the bore, communicates with the bore and opens through the lengthwise side and also through the top or upper end 12 and bottom or lower end 14. While these ends could be perfectly flat, they are preferably slightly convex, as is evident from Figure 2. Washers or disks of commercial plastics or any suitable lightweight material are provided and these are preferably of a diameter slightly less than the outside diameter of the float. They are also preferably flat-faced. The top disk is denoted by the numeral 16, and has a radial slot 18 which opens through its outer marginal edge with the inner closed end of the slot 20 registering with the upper end of the bore 8. The lower disk 22 has a radial slot 24 opening through the marginal edge with its inner end 26 registering with the bore 8. Both disks have off-center staple holes 28 therein to accommodate the pointed prongs 30 of the staples 32. The bight portion 34 of the staple rests atop the disk in the manner shown. The prongs 30 pass through the holes 28 and are embedded in the float 6, and in this manner, one half-portion of each disk, 16 or 22, is secured to the float. The other half-portion of each disk is free of direct connection to the float. Therefore, there is a slight space between the one side of the disk and the adjacent convex surface of the float. This provides a crotch between the slotted disk and float to admit the windings of the fishing line 36. The disks are stapled in place so that the slots therein are approximately 90° from the position of the slot in the float. Thus, these respective slots are out of line with each other. Also, the slot in the top disk extends to the left, as brought out in Figure 4, while the slot in the lower or bottom disk extends to the right, as shown in Figure 5.

These disks do not have to be stapled in place and may be in some other manner fixedly secured.

To place the float on the line, the line is placed in the slot 10 and is pulled and wound one or more times under the respective upper and lower disks 16 and 22 in a clockwise motion and brought up in the slot on the associated or cooperating disk. This is done at each end of the float. To remove the float, the operation is reversed by pulling the line out of the slot in each disk and in a counterclockwise motion around the slot in the float or cork, the other end being removed in the same way. The construction is also such that the end portions, either one or both, of the line may be wrapped and wedged between the disk and the float and wound or passed at least once around the cooperating staple, that is the prongs 30 of the staple 32 as shown, for example, at either end of the float in Fig. 1. The float may also be applied by installing the cork or float on the line, as already described, and then continuing the upper portion of the line on top of the cork, under the disk, down the side of the cork longitudinally and then back in the lower slot and then up through the slot in the cork and through the slot in the upper disk. It will be obvious, however, that the invention is not in the mode or method of using the device, but rather in the construction which permits the line to be used in these several ways and makes it possible to either quickly attach the float to the line and fasten it or readily unite and detach the float as the fisherman desires.

Since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows.

1. For use on a fishing line, an elongated buoyant body having an axial bore extending therethrough and a lengthwise slot communicating with the bore and opening radially through one side and the respective ends of said body, flat-faced disks superimposed upon the respective ends of said body, each disk being of an outside diameter slightly less than the outside diameter of the body, each disk having a slot radiating from the center and opening through one marginal edge, said disk slots being angularly spaced from the lengthwise body slot and having positions which are out of line with said lengthwise slot, means passing through said disks and eccentric thereto and positively securing the disks to said body, the slotted portion of each disk being free of attachment to the cooperating end portion of the body so as to provide a line winding and wedging space between the disk and adjacent cooperating end portion of said body, whereby that portion of the line cooperating with said winding space not only passes between the disk and end portion of said body but also passes at least once around said disk securing means.

2. For use on a fishing line, an elongated buoyant body having an axial bore extending therethrough and through the opposite ends thereof and also having a lengthwise slot communicating with the bore and commensurate in length therewith and opening radially through one side as well as the respective ends of said body, the ends of said body being convex a first flat disk superimposed upon one convex end of said body a second flat disk superimposed upon the opposite convex end of said body, each disk being axially centered relative to the long axis of the body and being of an outside diameter slightly less than the outside diameter of the body, each disk having a slot radiating from the center of the disk and opening through one marginal edge of the disk, the slots of the respective disks being angularly spaced from the lengthwise body slot and each having an angular position distinct from the other, the slotted portion of each disk being free of direct mechanical connection to the cooperating end of the body, each disk being provided eccentrically thereof with a pair of spaced holes, and a staple having prongs passing through the respective holes of the cooperating disk and anchored in the corresponding end of the body, so that each disk is fastened on the cooperating end portions of the body, the slotted portions of the respective disks being free of direct connection with the cooperating end portion of the body to the extent that a line winding space is thus provided between each disk and each end portion of the body whereby that portion of the line cooperating with said winding space not only passes between the disk and end portion of the body but also passes at least once around the cooperating staple.

References Cited in the file of this patent
UNITED STATES PATENTS

| | | |
|---|---|---|
| 249,559 | Truesdell | Nov. 15, 1881 |
| 390,518 | Rambicur | Oct. 2, 1888 |
| 522,167 | Rawlings | June 26, 1894 |
| 2,106,618 | Mehaffey | Jan. 25, 1938 |
| 2,434,734 | Buschmann | Jan. 20, 1948 |
| 2,575,832 | Perry | Nov. 20, 1951 |
| 2,691,842 | Brown | Oct. 19, 1954 |
| 2,700,200 | Buckley | Jan. 25, 1955 |